Feb. 17, 1925.

Re. 16,003

G. F. McCAHEY

BRAIDING MACHINE

Original Filed April 1, 1920 5 Sheets-Sheet 1

Inventor

George F. McCahey,

G. Leuchauer, Dyer & Darby

Attorneys

Feb. 17, 1925.

Re. 16,003

G. F. McCAHEY

BRAIDING MACHINE

Original Filed April 1, 1920 5 Sheets-Sheet 2

Inventor
George F. McCahey
By Cushman Bryant Darby
Attorneys

Feb. 17. 1925.

Re. 16,003

G. F. McCAHEY

BRAIDING MACHINE

Original Filed April 1, 1920 5 Sheets-Sheet 3

Inventor
George F. McCahey,
By Cushman, Bryant & Darby
Attorneys

Feb. 17. 1925.

Re. 16,003

G. F. McCAHEY

BRAIDING MACHINE

Original Filed April 1, 1920 5 Sheets-Sheet 4

Inventor
George F. McCahey
By Cushman, Bryant & Darby
Attorneys

Feb. 17. 1925. Re. 16,003

G. F. McCAHEY

BRAIDING MACHINE

Original Filed April 1, 1920 5 Sheets-Sheet 5

Inventor
George F. McCahey,
by Eustman, Dwyer and Darby
Attorneys

Reissued Feb. 17, 1925. Re. 16,003

UNITED STATES PATENT OFFICE.

GEORGE F. McCAHEY, OF PROVIDENCE, RHODE ISLAND, ASSIGNOR TO NEW ENGLAND BUTT COMPANY, OF PROVIDENCE, RHODE ISLAND, A CORPORATION OF RHODE ISLAND.

BRAIDING MACHINE.

Original No. 1,364,291, dated January 4, 1921, Serial No. 370,527, filed April 1, 1920. Application for reissue filed December 5, 1924. Serial No. 754,225.

*To all whom it may concern:*

Be it known that I, GEORGE F. McCAHEY, a citizen of the United States, residing at Providence, in the county of Providence and State of Rhode Island, have invented certain new and useful Improvements in Braiding Machines, of which the following is a specification.

This invention relates to improvements in braiding machines more particularly to the so-called rotary type of braider in which the yarn supplies are arranged in series to revolve in opposite directions about a common axis.

The invention has for its object to provide means whereby the yarn supplies of one set may be carried by the shuttles and supported thereby from their upper ends for the purpose of increasing the efficiency and rendering more effective the operation of the machine.

A further object of the invention is to position the yarn-tension weight standards of both sets of supplies on a corresponding incline to the common axis about which they revolve and rotate these carriers in opposite directions and in different planes, whereby the yarn tension devices of both sets may be so positioned that under action of centrifugal force an equal tension will be exerted on both sets of supplies, which is essential in the production of a uniform product.

The nature and advantages of the invention will be better understood when the following detail description is taken in connection with the accompanying drawings, the invention residing in the combination and arrangement of parts as claimed.

In the drawings forming part of this specification, like numerals of reference indicate similar parts in the several views and wherein:—

Figure 1:
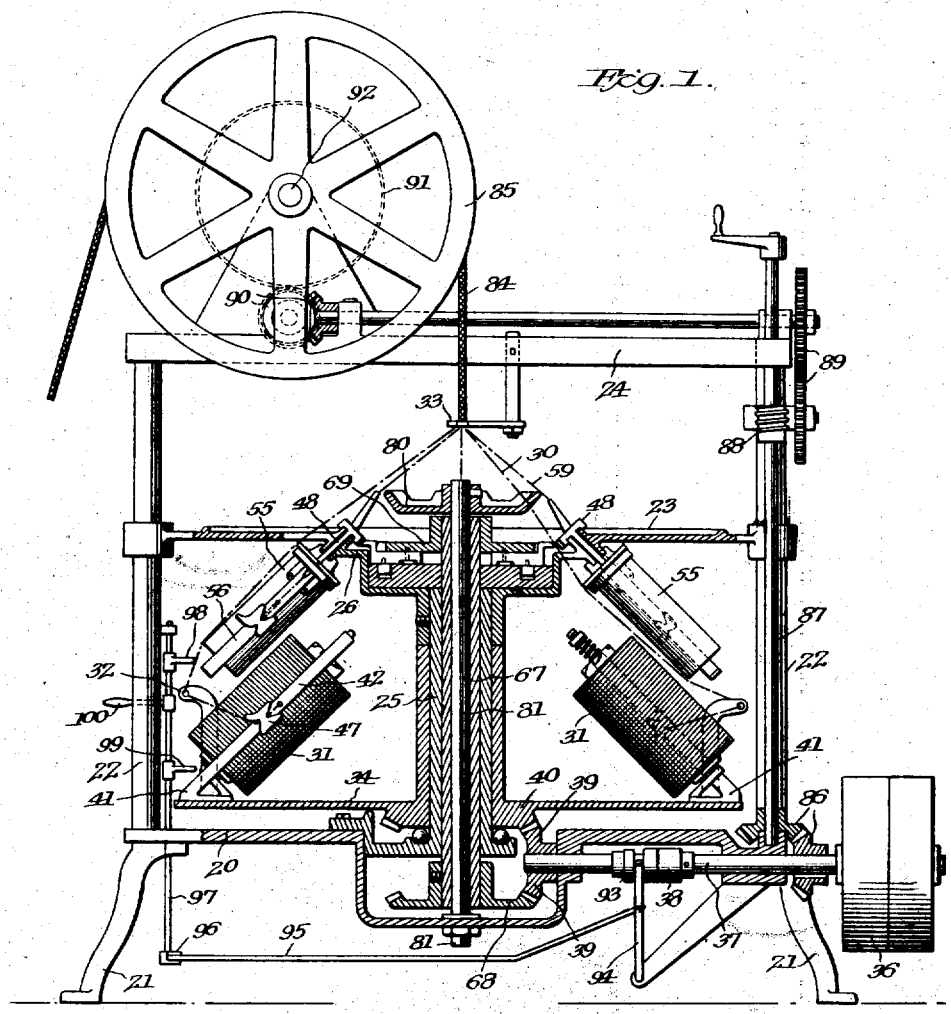
Figure 1 is a side elevation of the machine partly in section.
Figure 2:
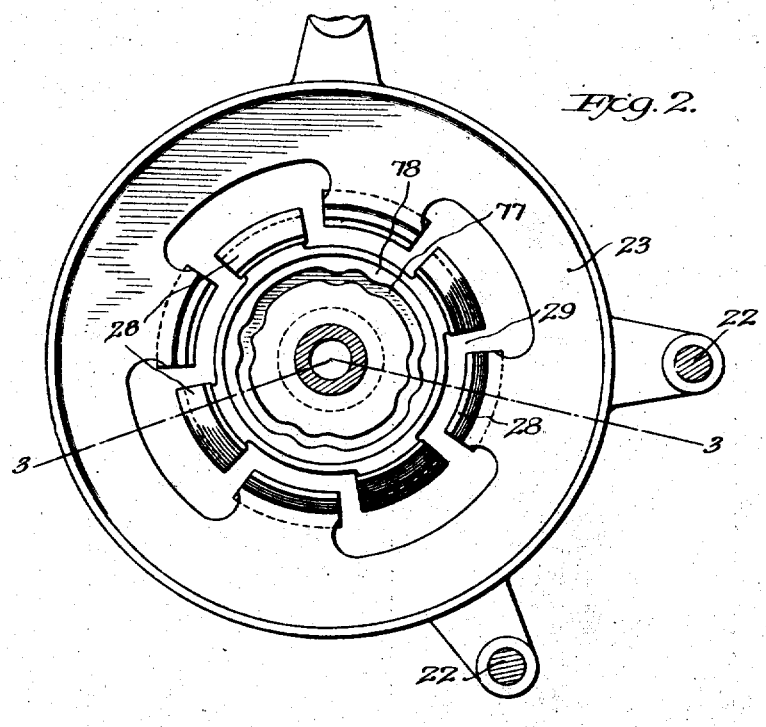
Fig. 2 is a top view of the raceway plate.
Figure 4:
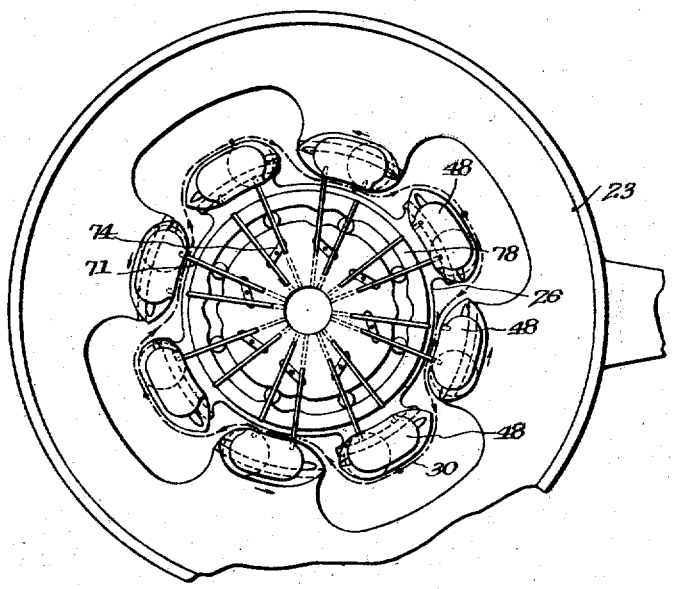
Fig. 4 is a somewhat distorted top view partly in section, showing the raceway plate with the shuttle-members as being driven about the raceway by means of the driver dogs.

With reference to the drawings, 20 designates the base-plate of the machine, which is supported on usual legs 21. On this base-plate are upright frame rods 22 which support the outer ring or member of the raceway plate 23 and also support the upper frame members 24. On this base-plate 20 I have fixed a tubular standard 25 to which is secured the inner section 26 of the raceway, which section is provided with alternate spaced-apart shuttle guiding surfaces, 27, which, as shown in Fig. 2, are formed on the arc of a circle and cooperate with the alternate shuttle guiding surfaces 28 of the outer raceway member 23 to form a ring for the support of the traveling shuttle (presently described). A space 29 being provided between the adjacent ends of the inner and outer grinding members, through which the yarn 30 is caused to pass as it leads from each of the lower supplies 31 through their respective guide eyes 32 to the point of braiding 33 and is carried in a serpentine path alternately over and under the shuttles and the upper series of supplies carried thereby as illustrated in Fig. 4.

On the plate 34, which is mounted to rotate on the ball bearings 35, actuated by the driving pulleys 36 through the shaft 37, clutch 38 and gears 39 and 40, is mounted the lower set of supplies to be rotated in one direction. Each supply of this set comprises a base 41 which is mounted on the revolving plate 34 and which base is arranged to support a tension weight guide bar 42 which extends in an upward direction on an incline to the common axis about which this set of supplies rotates. The upper end of this weight guide is arranged to support a spring pressed latch 43 for engaging the spool ratchet 44 of the bobbin 31, into the lower end of which spool projects a short spur 46 which extends into the hole through the spool to retain its lower end in position. The usual weight 47 being preferably employed to slide on the weight guide to apply the required tension to the yarn.

The shuttle member 48 has a central web 49 connected to the upper and lower pairs of flanges 50 and 51 all of which are formed on the arc of a circle necessary to engage and slide on the raceway sections as the shuttle is driven in a circle.

Below this raceway-engaging portion of the shuttle I have formed a thread-guiding plate 52 which is pointed at the front end at 53 and preferably rounded at its rear end 54 for the purpose of engaging and guiding the yarn either over or under the shuttle.

On the under side of this guide-plate I have secured a tubular yarn guiding and protecting member 55 to the outside of which is secured the weight guide 56, a weight 57 being mounted to slide thereon. A yarn guide-hole 58 is provided to permit the yarn 59 to pass out, down around the weight 57 and up through the tubular opening 60 in the shuttle head.

Within this tube I have mounted a bobbin 61 having a ratchet spool head 62 at its upper end engaged by a spring-pressed latch 63, the end 64 of which latch extends out through the opening in the side wall of the tube into position to be engaged by an upward throw of the weight 57 to release the spool when more yarn is required. This spool is held in position on the central rod 65 by a latch 66 which is pivoted in the end thereof.

Figure 3:
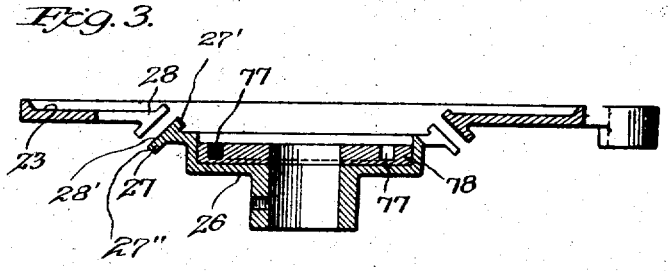
Fig. 3 is a sectional side elevation of the raceway plate.

The raceway guides 27 and 28 are set on an angle so as to receive the shuttles 48 and permit them to support the upper set of yarn supplies below the raceway and on an incline, the angle of which inclination is substantially the same as that of the supplies of the lower set and this upper set of supplies overlap the lower set and are so positioned that the tension weights of both sets shall be substantially equidistant from the common axis about which they both rotate so that centrifugal force shall act the same on both sets of weights as they revolve at the same circular speed, which uniform action on the tension weights, produces a uniform tension on both sets of threads which uniform effect cannot be obtained where weights are positioned at different distances from the center around which they rotate. It will be noted that the inner surface 27′ (Figure 3) of the raceway guide 27 is inclined at substantially a right angle to the axis of the yarn supplies; the outer surface 27″ may be also inclined in this manner. This inclination of one or both of the surfaces mentioned assists materially in the reduction of friction. The top surface 28′ is inclined in substantially the same plane as the shuttle, and substantially parallels the axis of the yarn supplies. Moreover, the entire track forming the raceway is arranged in a plane inclined at an angle to the common axis of the shuttles, as above mentioned, and illustrated clearly in Figure 3.

Figure 7:
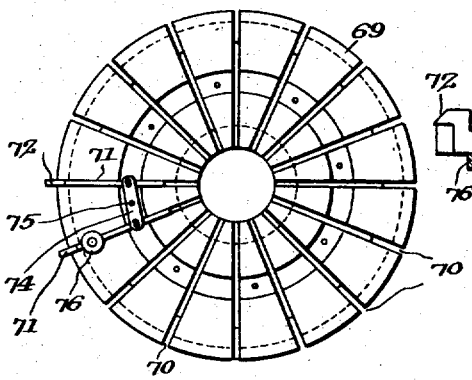
Fig. 7 is a view of the under side of the driver dog guide plate, showing one pair of drivers in position in the grooves in said plate.
Figure 8:
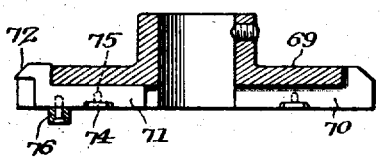
Fig. 8 is a sectional side elevation of the driver dog guide plate, showing one of the drivers in position therein.
Figure 9:
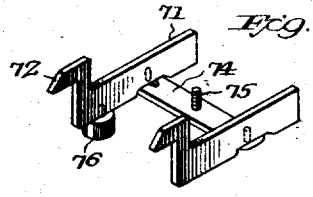
Fig. 9 is a perspective view showing a pair of the driver dogs as pivotally connected together whereby they are caused by their controlling cam to reciprocate oppositely.
Figure 10:
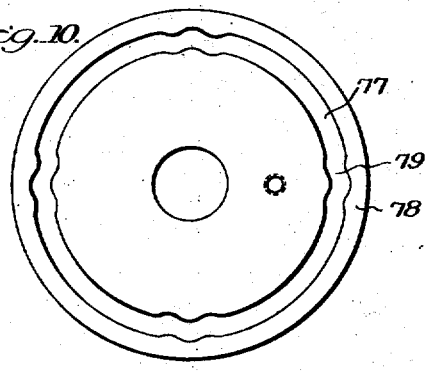
Fig. 10 is a view of the under side of the cam which controls the operation of the driver dogs.
Figure 11:
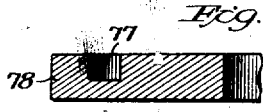
Fig. 11 is a sectional elevation showing a portion of the cam illustrated in Fig. 10.
Figure 12:
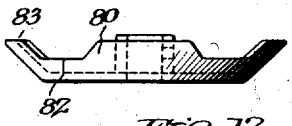
Fig. 12 is the fixed cam member which controls the position of the yarn thread in leading from its guide eye to the braiding point.
Figure 13:
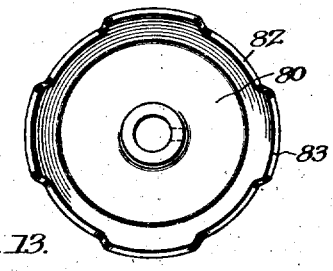
Fig. 13 is a plan view of this yarn guiding cam.
Figure 14:
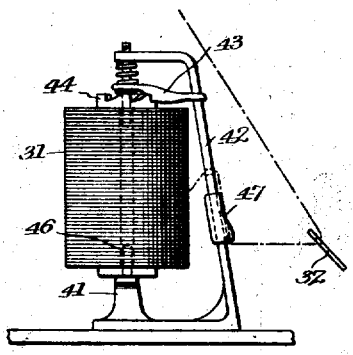
Fig. 14 is a side elevation showing one of the yarn supplies of the lower set.
Figure 15:
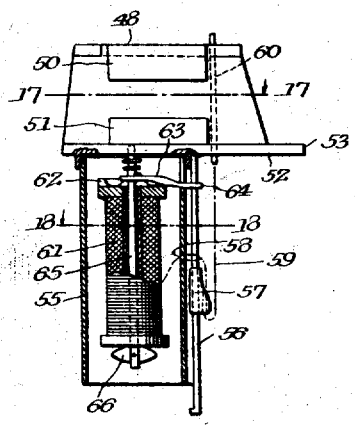
Fig. 15 is a side elevation partly in section of one of the shuttles and the upper yarn supply, illustrating its bobbin as housed in a tube.
Figure 18:
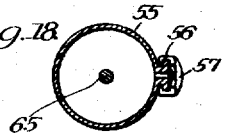
Fig. 18 is a section on line 18—18 of Fig. 15, through the cop-carrying tube and tension weight guide.
Figure 16:
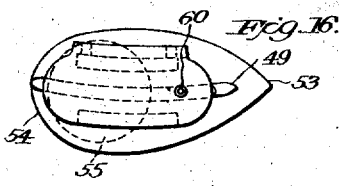
Fig. 16 is a top view of the shuttle member.
Figure 19:
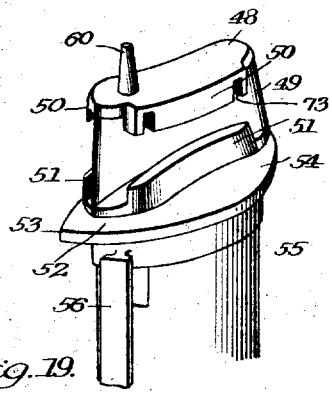
Fig. 19 is a perspective view of the shuttle member to which the cop-carrying tube is connected.
Figure 17:
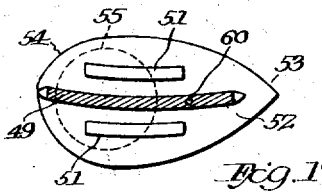
Fig. 17 is a section on line 17—17 of Fig. 15 through the web of the shuttle member.

In order to drive this upper set of yarn supplies in a direction opposite to that of the rotation of the lower set of yarn supplies, I have provided a tubular shaft 67 which is rotated from the gear 39 through the gear 68 to the upper end of which tubular shaft I have connected the drive-dog plate 69. This guide plate is best illustrated in Figs. 7 and 8 as being provided on its under side with a multiplicity of radial slots 70 in which the drive dogs 71 are guided, the ends 72 of these dogs being adapted to engage the recesses 73 in the shuttle flange and these dogs are yoked together in pairs by the plate 74, which plate is pivoted at 75 to the under side of the dog guide plate 69. One of each pair of these drive dogs is provided with a guide roll 76 which extends down into the cam groove 77 in the cam plate 78 whereby, as best illustrated in Fig. 4, each pair of drive dogs is reciprocated in and out at the proper time and at the points 79 in this cam, to permit the yarn from the lower supply to pass the shuttle of the upper supply without at any time entirely disengaging the drive from the shuttle, that is, before one dog is entirely withdrawn from the shuttle the other of the pair engages the shuttle permitting the yarn to pass between the dogs during their reciprocating action.

Figure 5:
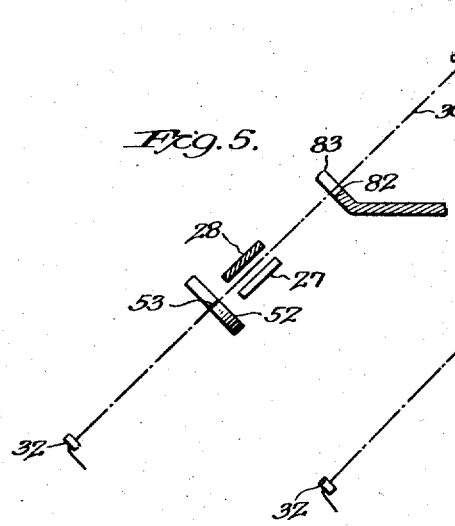
Fig. 5 is a diagrammatic view illustrating the normal position of the yarn leading from the lower supply through the guide eye thence through the raceway to the braiding point in which position it is engaged and guided around beneath the shuttles and upper supply.

The normal position of the yarn 30 which leads from the lower supply through the eye 32 to the point of braiding 33 lies in position just below the point 53 of the shuttle guide plate 52, as illustrated in Fig. 5. Therefore as the shuttle revolves this yarn rides downwardly around its edge beneath the upper supply members.

Figure 6:
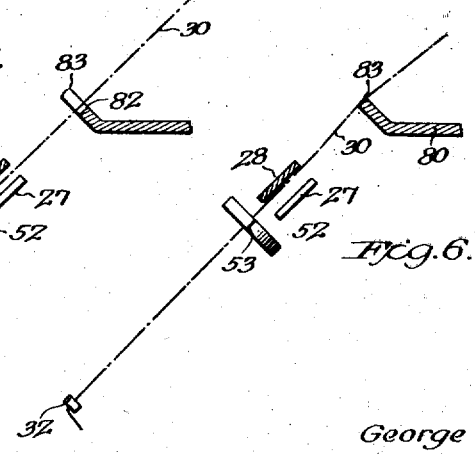
Fig. 6 is the same as Fig. 5 with the exception that the thread is engaged by a cam and raised into position to be guided above the passing shuttles.

In order to provide simple and effective means for lifting this yarn out of its normal position, I have mounted a fixed cam member 80 on the upper end of the fixed rod 81, which cam member is provided with recesses 82 and raised portions 83. As the lower supplies rotate they cause the yarn 30 to ride from the lower portion 82 of this cam plate up onto the raised portion 83 thereof, as illustrated in Fig. 6, thereby lifting the yarn to a position above the point 53 of the guide plate 52 whereby this plate then upon engaging this yarn rides under it and guides it over the upper supply and so, as illustrated in Fig. 4, the shuttles are caused to ride alternately under and over this yarn 30 as the two sets of supplies are revolved in opposite directions.

As the yarn is braided at the point 84 it is led over the take-up wheel 85 and conducted away, which wheel is shown as being driven from the main shaft 37 through gears 86, upright shaft 87, worm 88, spur gears 89, miter gears 90 and worm wheel 91 which is mounted on the take-up wheel shaft 92.

In order to stop the machine when the yarn breaks or for any reason becomes too slack, in either of the sets of supplies, I have provided a stop motion which consists of a clutch 93 on the shaft 37, which clutch is adapted to be withdrawn from its opposite clutch member 38 by means of the arm 94 through the connector 95, lever 96, and upright rod 97 on which rod is located a dog 98 to be engaged by the tension weight 57 of the upper set, and a dog 99 to be engaged by the tension weight 47 of the lower set when either of these weights is, for any reason, moved to its low or stop position. The handle 100 is also provided by which this stop motion may be manually operated when desired.

By my improved construction of rotary braider it will be noted that I support the upper set of supplies by their upper ends and below the raceway and by mounting both sets on the corresponding incline to rotate in different planes I am enabled to position the tension weights of both sets so that they are disposed to revolve at substantially the same distance from the common center about which they rotate, whereby centrifugal force acts upon the weights of both sets equally to produce a uniform tension on the yarn from the supplies from the different sets. By my improved construction I am enabled to reduce the number of parts and have provided a machine which may be run at very high rate of speed to increase the production which is of a uniform quality.

By the term "shuttle" I include the whole member or element which travels in the raceway and supports the supply of yarn or thread.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. In a braiding machine, a raceway, a set of shuttles adapted to travel in said raceway, and a yarn supply carried by each of said shuttles and located on a plane below said raceway, each of said supplies having its axis inclined toward the braiding point, a rotatable turret within said raceway, and means for connecting said turret to said shuttles for causing the same to traverse the raceway.

2. In a braiding machine, two sets of yarn supplies mounted to rotate in opposite directions, a raceway, a shuttle in said raceway, one of said sets of yarn supplies being carried by said shuttle and located below said raceway, the axis of said shuttle carrying yarn supply being inclined at a slight angle to the common axis about which they revolve, a rotatable turret within said raceway, and means for connecting said turret to said shuttle for causing the same to traverse the raceway.

3. In a braiding machine, two sets of yarn supplies, a raceway, a set of shuttles mounted to travel in said raceway, one of said sets of yarn supplies being carried by said shuttles, said shuttle yarn supplies being located below said raceway, the axis of each of said supplies being inclined at an angle to the common axis about which they revolve, and means located above the shuttle and its yarn supply for deflecting the yarn leading from the lower supplies to pass alternately over and under said shuttles.

4. In a braiding machine, two sets of yarn supplies, a raceway, a set of shuttles mounted to travel in said raceway, one of said sets of yarn supplies being carried by said shuttles, said shuttle yarn supplies being located below said raceway, the axis of each of said supplies being inclined to the common axis about which they revolve, and a cam located immediately beneath the braiding point and above the raceway and both supplies for deflecting the yarn leading from the lower supplies to pass alternately over and under said shuttles.

5. In a braiding machine, two sets of yarn supplies mounted to rotate in opposite directions and in different planes, a raceway, a set of shuttles in said raceway carrying one of said sets of yarn supplies, said shuttle supplies being located below said raceway and having their axes inclined at a slight angle to the common axis about which they revolve, and a fixed cam located above the raceway for controlling the position of the yarn leading from the lower set whereby it is caused to be deflected in and out around the supplies of the upper set.

6. In a braiding machine the combination with a plurality of yarn supplies arranged in two sets to revolve in opposite directions and in different horizontal planes about a common center, a raceway, a set of shuttles mounted to travel therein and carry one of said sets of supplies, a standard on the lower set of supplies inclined at a slight angle to the axis of said common center, and a yarn tension weight slidable on each of said standards and both of said sets of supplies being located below said raceway.

7. In a braiding machine, two sets of yarn supplies, a raceway, a set of shuttles mounted to travel in said raceway, one of said sets of yarn supplies being carried by said shuttles and both sets being located below said raceway, a weight guide standard on each supply of both sets inclined at a slight angle relative to the common axis about which they all revolve, and a yarn tension weight slidably mounted on each of said guide standards.

8. In a braiding machine the combination with a plurality of yarn supplies arranged in two sets, a raceway, a set of shuttles mounted to travel therein and carry one of said sets, both sets being provided with tention weight carrying standards inclined at substantially the same angle and arranged to revolve in opposite directions and in different horizontal planes about a common center below the plane of said raceway, and a yarn tension weight slidably mounted on each of said standards of each set and all mounted to operate at substantially equal distances from the center about which they rotate.

9. In a braiding machine, a raceway, a set of shuttles adapted to travel in said raceway, and a yarn supply carried by each of said shuttles and located on a plane below said raceway, each of said supplies having its axis inclined toward the braiding point, said shuttles being likewise inclined.

10. In a braiding machine, two sets of yarn supplies mounted to rotate in opposite directions, a raceway, a shuttle in said raceway, one of said sets of yarn supplies being carried by said shuttle and located below said raceway, the axis of said shuttle carried yarn supply being inclined at a slight angle to the common axis about which they revolve, and the shuttle being likewise inclined.

11. In a braiding machine, shuttle guiding and supporting means forming a raceway, a set of shuttles supported by and traveling on said raceway, and a yarn supply carried by each of said shuttles and located on a plane below said raceway, each of the shuttles being inclined toward the braiding point with each of the supplies having its axis likewise inclined, said guiding and supporting means being inclined toward the common axis of said shuttles and at substantially a right angle to the axis of each yarn supply.

12. In a braiding machine, shuttle guiding and supporting means forming a raceway, a set of shuttles supported by and traveling on said raceway, and a yarn supply carried by each of said shuttles and located on a plane below said raceway, each of the shuttles being inclined toward the braiding point with each of the supplies having its axis likewise inclined, the inner surface of said guiding means being inclined toward the common axis of said shuttles.

13. In a braiding machine, shuttle guiding and supporting means forming a raceway, a set of shuttles supported by and traveling on said raceway, and a yarn supply carried by each of said shuttles and located on a plane below said raceway, each of the shuttles being inclined toward the braiding point with each of the supplies having its axis likewise inclined, the inner surface of said guiding means being inclined toward the common axis of said shuttles, and at substantially a right angle to the axis of each yarn supply.

14. In a braiding machine, shuttle guiding and supporting means forming a raceway, a set of shuttles supported by and traveling on said raceway, and a yarn supply carried by each of said shuttles and located on a plane below said raceway, each of the shuttles being inclined toward the braiding point with each of the supplies having its axis likewise inclined, the inner and outer surfaces of said guiding means being inclined toward the common axis of said shuttles, and at substantially a right angle to the axis of each yarn supply.

15. In a braiding machine, a raceway, a set of shuttles adapted to travel in said raceway, and a yarn supply carried by each of said shuttles and located on a plane below said raceway, each of said supplies having its axis inclined toward the braiding point, said shuttles and raceway being likewise inclined.

16. In a braiding machine, two sets of yarn supplies mounted to rotate in opposite directions, a raceway, a shuttle in said raceway, one of said sets of yarn supplies being carried by said shuttle and located below said raceway, the axis of said shuttle carried yarn supply being inclined at a slight angle to the common axis about which they revolve, and the shuttle and raceway being likewise inclined.

17. A braiding machine comprising a base, a central rigid post mounted therein, a sleeve rotatably mounted on said post and carrying an inner turret at its upper end, an outer turret mounted around said sleeve, the upper end of said outer turret forming a guiding and supporting raceway, an inner series of carriers mounted on said raceway and extending outwardly and downwardly therefrom, said carriers being inclined toward the braiding point and positioned in a plane below said raceway, means carried by the inner turret for intermittently connecting the inner series of carriers thereto, an inner series of thread bobbins mounted on the inner series of carriers with their axes inclined toward the braiding point, a support for an outer series of thread bobbins rotatably mounted upon said post, and means for rotating said inner turret and said support in opposite directions.

18. A braiding machine comprising a base, a central rigid post mounted therein, a sleeve rotatably mounted on said post and carrying an inner turret at its upper end, an outer turret mounted around said sleeve, the upper end of said outer turret being positioned in a plane upwardly and outwardly inclined from said post and forming a guiding and supporting raceway, an inner series of carriers mounted on said raceway and extending outwardly and downwardly therefrom, said carriers being inclined toward the braiding point and positioned in a plane below said raceway, means carried by the inner turret for intermittently connecting the inner series of carriers thereto, an inner series of bobbins on said carriers with their axes inclined at an angle toward the common axis of the carriers, a support for an outer series of thread bobbins rotatably mounted around said post, and means for rotating said inner turret and said support in opposite directions.

19. A braiding machine comprising a base, a central rigid post mounted therein, a sleeve rotatably mounted on said post and carrying an inner turret at its upper end, an outer turret mounted around said sleeve, the upper end of said outer turret forming a guiding and supporting raceway, an inner series of carriers mounted on said raceway and extending outwardly and downwardly therefrom, said carriers being inclined toward the braiding point and positioned in a plane below said raceway, means carried by the inner turret for intermittently connecting the inner series of carriers thereto, an inner series of thread bobbins mounted on the inner series of carriers with their axes inclined at an angle toward the common axis of the carriers, a support for an outer series of thread bobbins rotatably mounted around said post, means for rotating said inner turret and said support in opposite directions, an outer series of thread bobbins carried by said support, and a series of stationary thread guides adapted to engage the threads from the outer series of bobbins and guide them over the bobbins of the inner carriers.

20. A braiding machine comprising a base, a central rigid post mounted therein, a sleeve rotatably mounted on said post and carrying an inner turret at its upper end, an outer turret mounted around said inner turret, the upper end of said outer turret being positioned in a plane upwardly and outwardly inclined from said post forming a guiding and supporting raceway, an inner series of carriers mounted on said raceway and extending outwardly and downwardly therefrom, said carriers being inclined toward the braiding point and positioned in a plane below said raceway, means carried by the inner turret for intermittently connecting the inner series of carriers thereto, a support for an outer series of threaded bobbins rotatably mounted upon said post, means for rotating said inner turret and said support in opposite directions, an outer series of thread bobbins carried by said support, and a stationary substantially annular member having a series of stationary thread guides adapted to engage the threads from the outer series of bobbins and guide them over the bobbins of the inner carriers.

21. In a braiding machine, two sets of yarn supplies mounted to rotate in opposite directions, a raceway, carriers for one inner set of yarn supplies travelling on said raceway, said carriers extending downwardly and outwardly from the raceway and being inclined toward the braiding point, the yarn supplies on said carriers having their axes inclined toward the braiding point, carriers for a second outer set of yarn supplies located below said raceway carriers, and a series of stationary thread guides adapted to engage the threads from the lower set of supplies and guide them over the yarn supplies on the raceway carriers.

22. In a braiding machine, a base, a rigid post extending upwardly from said base, a raceway positioned in a plane inclined upwardly and outwardly from said post, an inner set of carriers mounted on said raceway and extending downwardly and outwardly therefrom and inclined toward the braiding point, a yarn supply on each of said carriers with its axis inclined toward the braiding point, a rotatable driving turret for said carriers within said raceway, means for intermittently coupling said driving turret with the carriers as it rotates, a rotatable support for an outer series of yarn carriers mounted on said shaft and below said raceway carriers, and means for rotating said support and said driving turret in opposite directions.

23. In a braiding machine, a base, a rigid post extending upwardly from said base, a raceway positioned in a plane inclined upwardly and outwardly from said post, an inner set of carriers mounted on said raceway and extending downwardly and outwardly therefrom and inclined toward the braiding point, a yarn supply on each of said carriers with its axis inclined at an angle to the common axis of the carriers, a rotatable driving turret for said carriers within said raceway, means for coupling said driving member with the carriers as it rotates, a rotatable support for an outer series of yarn carriers mounted around said post below said raceway carriers, means for rotating said support and said driving member in opposite directions, and a series of stationary thread guides adapted to engage the threads from the outer series of yarn supplies and guide them over the supplies of the raceway carriers.

GEORGE F. McCAHEY